United States Patent
Liang et al.

(10) Patent No.: US 9,483,076 B2
(45) Date of Patent: Nov. 1, 2016

(54) EXTERNAL ELECTRONIC DEVICE AND RELATED COMPUTER SYSTEM

(71) Applicant: Wistron Corporation, New Taipei (TW)

(72) Inventors: Chen-Yi Liang, New Taipei (TW); Cheng-Hsiang Chuang, New Taipei (TW); Chu-Chia Tsai, New Taipei (TW); Cheng-Hsing Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 180 days.

(21) Appl. No.: 14/262,801

(22) Filed: Apr. 27, 2014

(65) Prior Publication Data

US 2015/0043155 A1    Feb. 12, 2015

(30) Foreign Application Priority Data

Aug. 7, 2013  (TW) .............................. 102128357 A

(51) Int. Cl.
*G06F 1/16*    (2006.01)

(52) U.S. Cl.
CPC ........... *G06F 1/1632* (2013.01); *G06F 1/1626* (2013.01); *G06F 1/1669* (2013.01); *G06F 1/1654* (2013.01)

(58) Field of Classification Search
CPC .. G06F 1/1632; G06F 1/1669; G06F 1/1681; G06F 1/1624; G06F 1/1654; G06F 1/1626; Y10T 16/53864; Y10T 16/547; Y10S 439/929; H01R 33/975; H02J 7/0044; H05K 7/14; A45C 2011/003; A45C 2200/15; E05D 7/12

USPC .............. 361/679.09, 679.17, 679.3, 679.41, 361/679.43, 679.44, 679.55; 206/45.2, 467, 206/468, 470
See application file for complete search history.

(56) References Cited

U.S. PATENT DOCUMENTS 7,066,752 B2 *  6/2006  Hsu .................. H01R 13/62905
                                                    439/248
8,599,542 B1 *  12/2013  Healey .................. G06F 1/1626
                                                    345/168

(Continued)

FOREIGN PATENT DOCUMENTS

| TW | 201246014 | 11/2012 |
|---|---|---|
| TW | 201303554 | 1/2013 |
| TW | 201309174 | 2/2013 |

OTHER PUBLICATIONS

Office action mailed on Jun. 26, 2015 for the Taiwan application No. 102128357, filing date: Aug. 7, 2013, p. 2-4 and p. 5 line 1-5.

*Primary Examiner* — James Wu
(74) *Attorney, Agent, or Firm* — Winston Hsu; Scott Margo

(57) ABSTRACT

An external electronic device for connecting to a portable electronic device is disclosed in the present invention. The external electronic device includes a base, a sliding component, a holder and a first hinge mechanism. The sliding component is slidably disposed on the base. The holder includes a body, an accommodating portion, an attractive component and a pushing portion. The body supports the portable electronic device. The accommodating portion whereinside the magnetic is movably disposed is formed on the body. The holder utilizes a magnetic force to attract a magnetic of the portable electronic device, so as to connect the portable electronic device with the holder. The pushing portion is disposed on an outer surface of the body for contacting an inclined guiding structure of the sliding component, so as to move the sliding component relative to the base. The first hinge mechanism is disposed between the base and the holder.

20 Claims, 17 Drawing Sheets

(56) References Cited

U.S. PATENT DOCUMENTS

| | | |
|---|---|---|
| 8,913,376 B2 | 12/2014 | Wu |
| 2011/0164375 A1* | 7/2011 | Hayashida ............ G06F 1/1632 361/679.41 |
| 2012/0212900 A1* | 8/2012 | Hung .................... G06F 1/1632 361/679.41 |
| 2013/0027872 A1 | 1/2013 | Lin |
| 2013/0031289 A1 | 1/2013 | Yeh |

* cited by examiner

EXTERNAL ELECTRONIC DEVICE AND RELATED COMPUTER SYSTEM

BACKGROUND OF THE INVENTION

1. Field of the Invention

The present invention relates to an external electronic device, and more particularly, to an external electronic device and a related computer system with convenient assembly/disassembly function.

2. Description of the Prior Art

The electronic devices, such as tablet computers, are popular information technology products in the electronic products market presently. Tablet computers can be collocated with a base for supporting the tablet computer or providing a key-in function. For example, when it is desired to utilize the tablet computer in a notebook computer mode, the tablet computer can be inserted into the base with a keyboard. However, there is a single slot on the conventional base for connecting with the tablet computer so that the conventional tablet computer only can be utilized in a fixed angle. In addition, the tablet computer sways easily so that the tablet computer might be separated from the base to collide onto the floor or something else when the tablet computer is carried with the base because the tablet computer is fixed on the base only by the single slot. In consideration of it, it is a significant issue to design a fixing device for fixing a portable electronic device stably nowadays.

SUMMARY OF THE INVENTION

The present invention provides an external electronic device and a related computer system with convenient assembly/disassembly function for solving above drawbacks.

According to the claimed invention, an external electronic device for connecting to a portable electronic device is disclosed. The portable electronic device has a first attractive component. The external electronic device includes a base, a holder and a first hinge mechanism. The holder is rotatably disposed on the base. The holder includes a body, an accommodating portion and a second attractive component. The body is for holding the portable electronic device. The second attractive component is disposed on the accommodating portion. The second attractive component attracts the first attractive component to connect the portable electronic device with the holder. The first hinge mechanism is disposed between the base and the holder. The holder rotates relative to the base via the first hinge mechanism.

According to the claimed invention, the external electronic device further includes a sliding component slidably disposed on the base, and the sliding component includes an inclined structure, the holder further comprises a pushing portion disposed on an outer surface of the body to contact against the inclined structure, the pushing portion presses the inclined structure when the holder rotates relative to the base, so as to move the sliding component relative to the base.

According to the claimed invention, the sliding component further includes a support structure. The pushing portion pushes the support structure to move out of the base when the holder rotates relative to the base.

According to the claimed invention, the external electronic device further includes a chute seat and a first slide shaft. The chute seat is disposed on the base, and a guide slot is formed on the chute seat. The first slide shaft is disposed on the sliding component. An end of the first slide shaft is movably disposed inside the guide slot.

According to the claimed invention, the sliding component further includes a constraint structure, and the external electronic device further includes a second slide shaft. The second slide shaft is disposed on the base. Two ends of the second slide shaft movably contact against the constraint structure.

According to the claimed invention, the base includes a sunken structure, and the holder is disposed inside the sunken structure.

According to the claimed invention, the body includes a bottom portion and a lateral portion for respectively holding adjacent surfaces of the portable electronic device. The bottom portion is connected to the lateral portion to form an L-shaped structure.

According to the claimed invention, the portable electronic device includes a constraint slot, and the holder further includes a positioning portion. The positioning portion is disposed inside the body for wedging with the constraint slot to engage the portable electronic device between the positioning portion and the body.

According to the claimed invention, a moving direction of the second attractive component inside the accommodating portion is different from an extending direction of the positioning portion.

According to the claimed invention, the first hinge mechanism includes a first connecting component and two second connecting components. The first connecting component is disposed on the body. The second connecting components are disposed on the base and respectively pivot to ends of the first connecting component.

According to the claimed invention, the external electronic device further includes a second hinge mechanism disposed between the base and the body.

According to the claimed invention, the holder further includes a first bridging portion and a second bridging portion disposed on an outer surface of the body and respectively connected to the first hinge mechanism and the second hinge mechanism.

According to the claimed invention, the second hinge mechanism includes an arm, and an open slot is formed on the arm. The holder further includes a rotary shaft disposed on the body and slidably disposed inside the open slot. The rotary shaft slides along the opening slot to rotate the arm when the holder rotates.

According to the claimed invention, a computer system includes a portable electronic device and an external electronic device. The portable electronic device includes a casing and a first attractive component. The first attractive component is disposed on an edge of the casing. The portable electronic device is electrically connected to the external electronic device in a detachable manner. The external electronic device includes a base, a holder and a first hinge mechanism. The holder is rotatably disposed on the base. The holder includes a body, an accommodating portion and a second attractive component. The body is for holding the portable electronic device. The second attractive component is disposed on the accommodating portion. The second attractive component attracts the first attractive component to connect the portable electronic device with the holder. The first hinge mechanism is disposed between the base and the holder. The holder rotates relative to the base via the first hinge mechanism.

According to the claimed invention, a stage structure is formed on an inner wall of the constraint slot.

According to the claimed invention, the portable electronic device further includes a first magnetic component set, and the external electronic device further includes a second magnetic component set. The portable electronic device is assembled with or disassembled from the external electronic device via magnetic force generated by the first magnetic component set and the second magnetic component set.

The holder of the external electronic device of the present invention is hidden inside the base for preferred aesthetic. Assembly of the positioning portion and the attractive components can be adapted to assemble the portable electronic device with the external electronic device for preferable assembly/disassembly convenience. As the view angle of the portable electronic device is adjusted, the movable sliding component can change the gravity center's position of the external electronic device. Thus, the external electronic device and the related computer system of the present invention not only have advantages of slight volume and easy operation, but also effectively solve conventional drawbacks of difficult position setting and inaesthetic appearance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
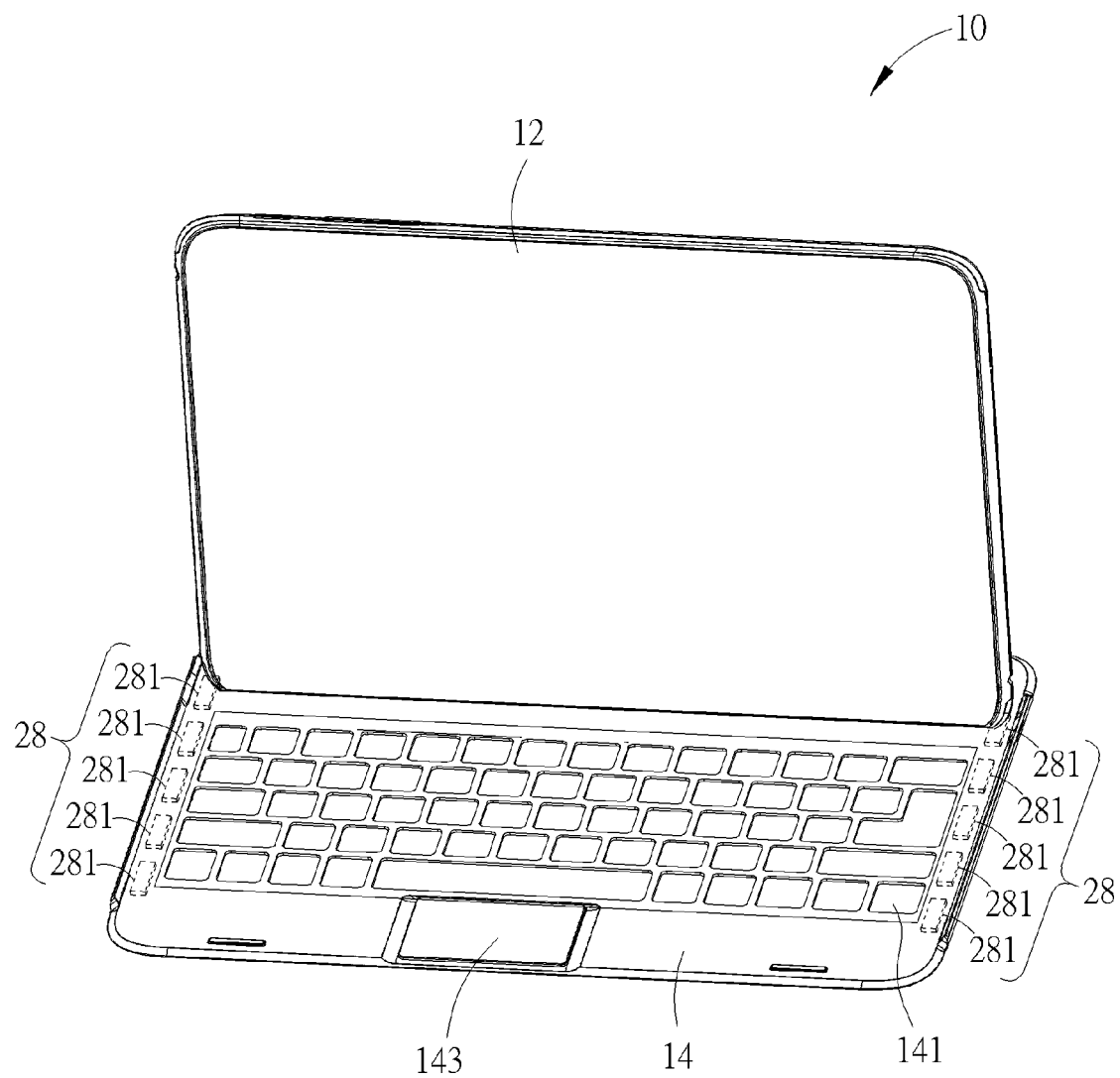
FIG. 1 is an assembly diagram of a computer system according an embodiment of the present invention.

Please refer to FIG. 1. FIG. 1 is an assembly diagram of a computer system 10 according an embodiment of the present invention. The computer system 10 includes a portable electronic device 12 and an external electronic device 14. The portable electronic device 12 can be a tablet computer. The external electronic device 14 can be a fixing device with the input module (such as the keyboard and the touch pad), the sound box and the screen. The screen of the portable electronic device 12 can be the touch panel. The portable electronic device 12 is electrically connected to the external electronic device 14 in a detachable manner, and the keyboard 141 and the touch pad 143 of the external electronic device 14 can be utilized to input the control command for control of the portable electronic device 12. The portable electronic device 12 rotatably stands upon the external electronic device 14 to adjust a view angle of the portable electronic device 12, and the view angle is preferably within a range of 100~135 degrees.

Figure 2:
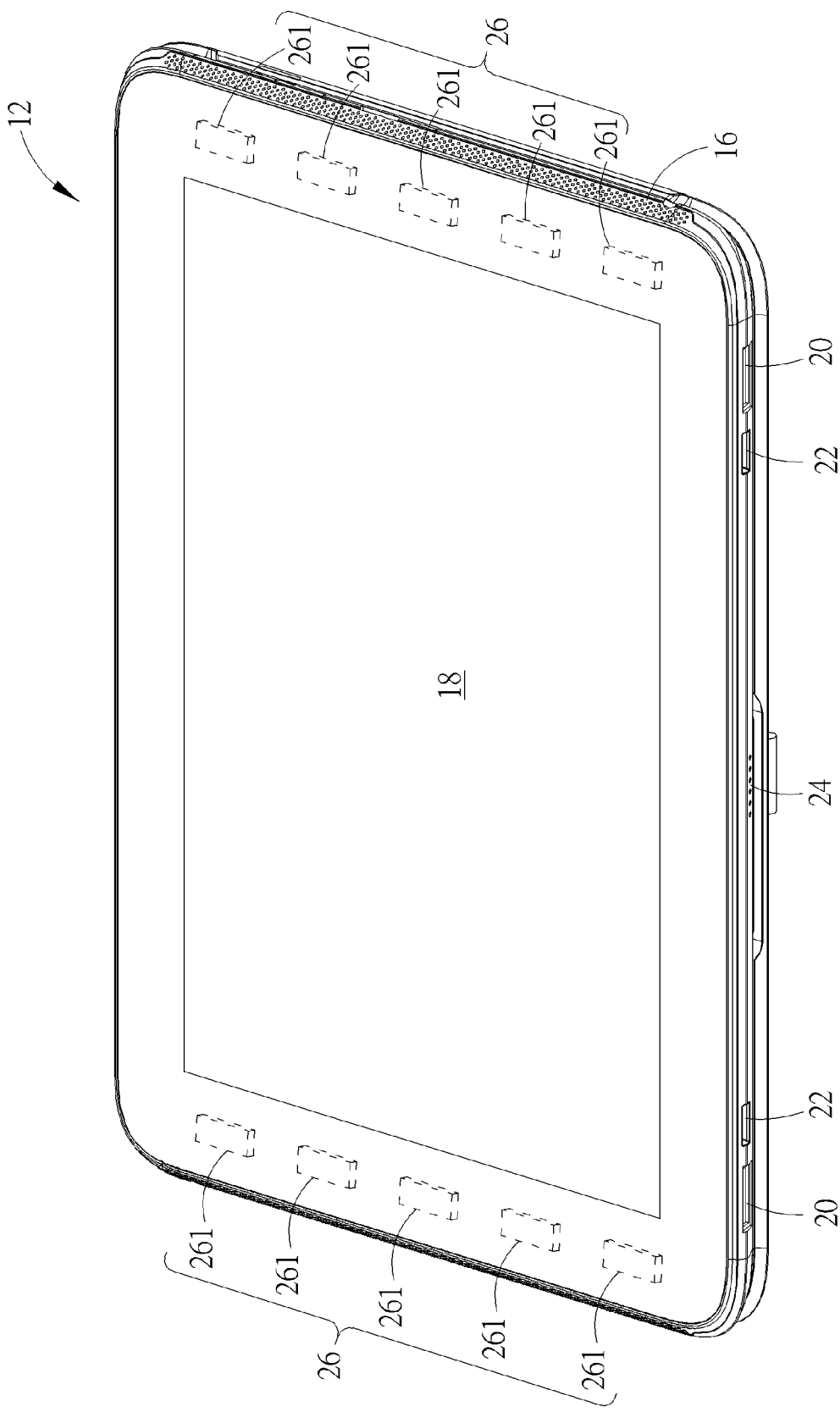
FIG. 2 is a diagram of a portable electronic device according to the embodiment of the present invention.

Please refer to FIG. 1 and FIG. 2. FIG. 2 is a diagram of the portable electronic device 12 according to the embodiment of the present invention. The portable electronic device 12 includes a casing 16, a touch panel 18, at least one first attractive component 20, at least one constraint slot 22 and a signal transmitter 24. The touch panel 18 is disposed on an upper surface of the casing 16. The first attractive component 20, the constraint slot 22 and the signal transmitter 24 are disposed on the same edge of the casing 16. The portable electronic device 12 further includes two first magnetic component sets 26 respectively disposed on opposite sides of the touch panel 18. Each first magnetic component set 26 includes a plurality of magnetic components 261. The external electronic device 14 accordingly includes two second magnetic component sets 28, and each second magnetic component set 28 includes a plurality of magnetic components 281. An amount and position of the magnetic component 261 correspond to an amount and position of the magnetic component 281. The portable electronic device 12 can be assembled with the external electronic device 14 in a planar manner via magnetic attractive force generated by the first magnetic component set 26 and the second magnetic component set 28, so that the computer system 10 has advantages of convenient carry and easy assembly. As the portable electronic device 12 moves relative to the external electronic device 14 at the horizontal direction, the first magnetic component set 26 misaligns with the second magnetic component set 28 to generate magnetic repulsive force, and the portable electronic device 12 is disassembled from the external electronic device 14.

Figure 3:
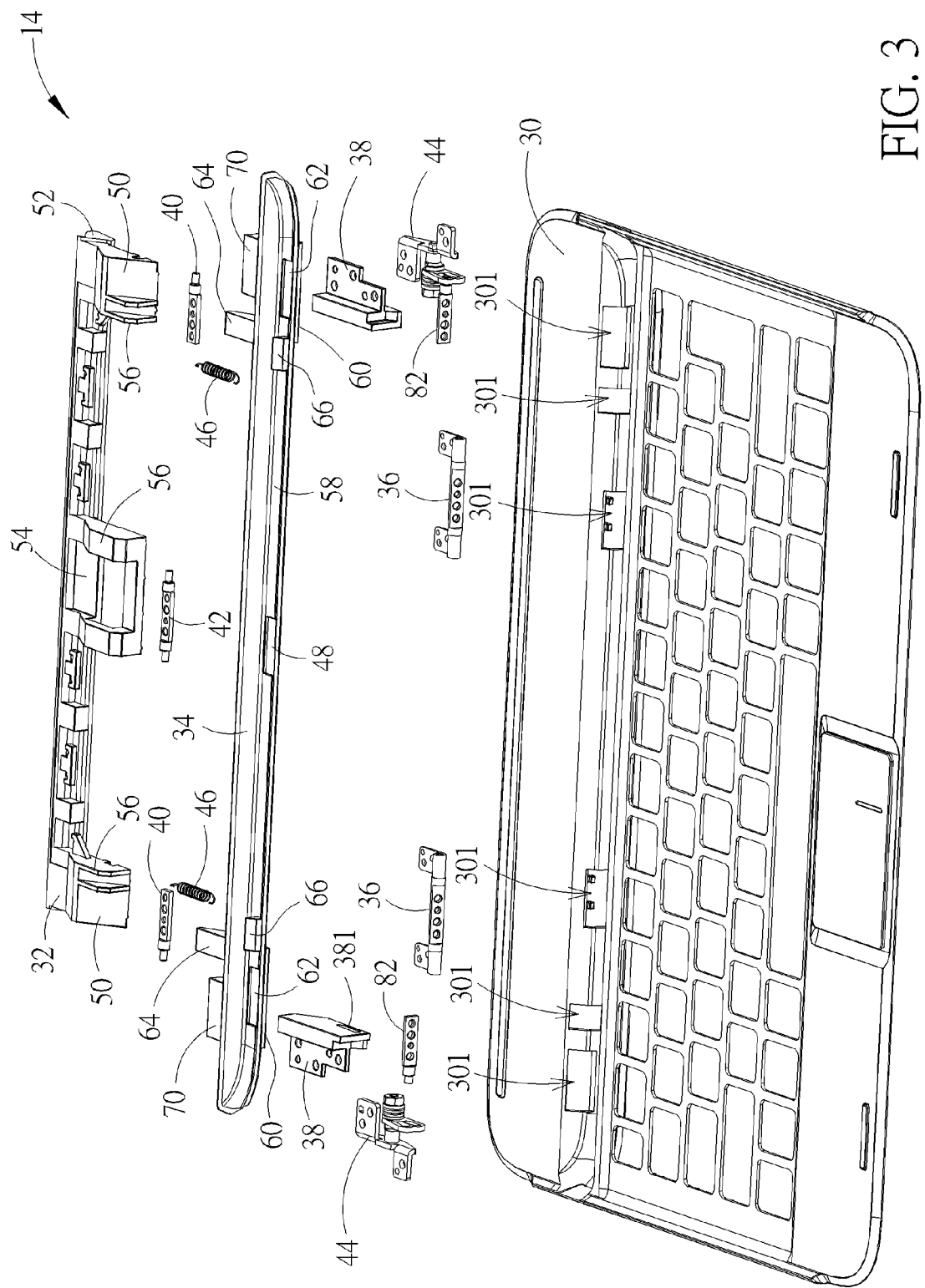
FIG. 3 is an exploded diagram of an external electronic device according to the embodiment of the present invention.

Please refer to FIG. 3. FIG. 3 is an exploded diagram of the external electronic device 14 according to the embodiment of the present invention. The external electronic device 14 includes a base 30, a sliding component 32, a holder 34, at least one first hinge mechanism 36, at least one chute seat 38, at least one first slide shaft 40, a second slide shaft 42, at least one second hinge mechanism 44, at least one resilient component 46 and a signal adapter 48. The sliding component 32 is slidably disposed on the base 30, and can be omitted according to actual demand. The holder 34 is connected to the base 30 via the first hinge mechanism 36 and the second hinge mechanism 44, which means the holder 34 is rotatably disposed on the base 30. The holder 34 is adapted to hold the portable electronic device 12, and to press the sliding component 32 out of the base 30 when rotating relative to the base 30. Gravity center of the external electronic device 14 can be adjusted by movement of the sliding component 32, so as to stably hold the portable electronic device 12.

Figure 4:
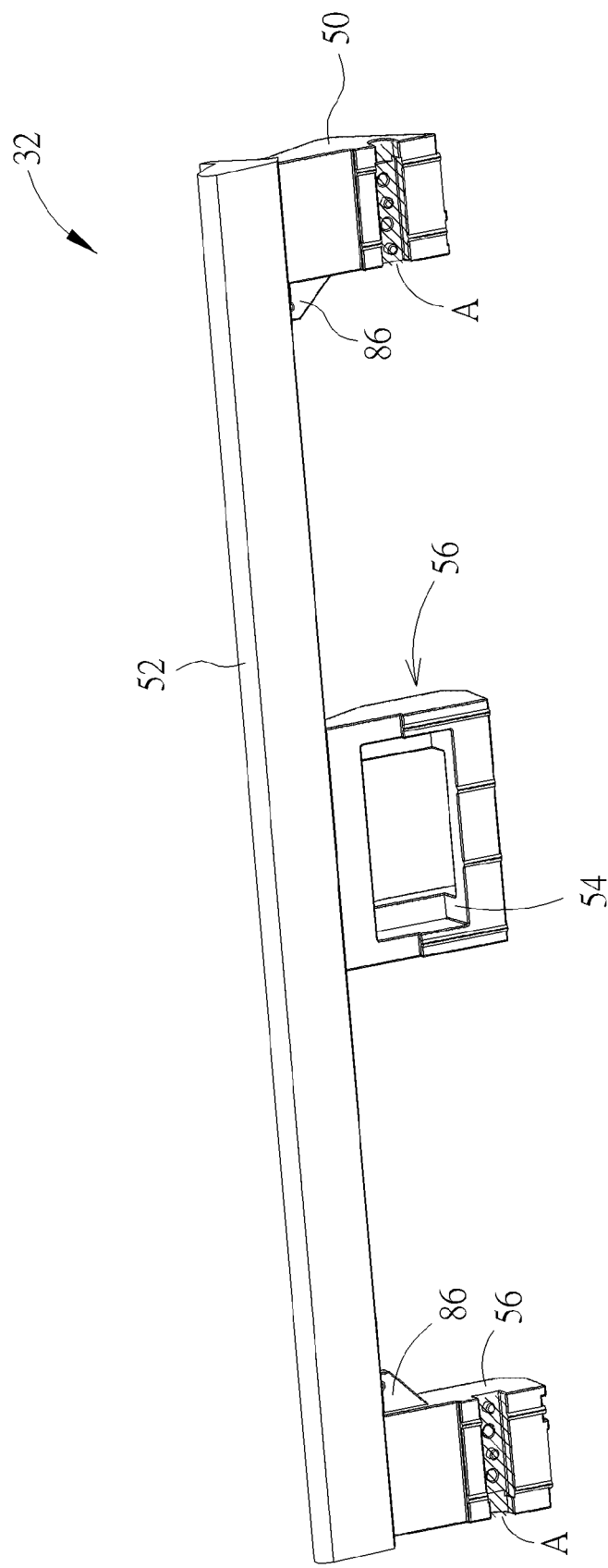
FIG. 4 is a diagram of a sliding component according to the embodiment of the present invention.

Please refer to FIG. 3 and FIG. 4. FIG. 4 is a diagram of the sliding component 32 according to the embodiment of the present invention. The sliding component 32 shown in FIG. 4 is another view of the sliding component 32 shown in FIG. 3. The sliding component 32 includes at least one inclined structure 50, a support structure 52, a constraint structure 54 and at least one hold structure 56. The inclined structure 50 and the support structure 52 are respectively disposed on opposite sides of main body of the sliding component 32. The sliding component 32 can include two inclined structures 50 respectively disposed on two ends of the main body. The two inclined structures 50 face toward the holder 34. The holder 34 can press the inclined structure 50 to move the sliding component 32 relative to the base 30, and to move the support structure 52 out of the base 30. In addition, the constraint structure 54 is disposed between the inclined structures 50. The plurality of hold structures 56 can be respectively disposed between the constraint structure 54 and the inclined structure 50. An upper surface and a bottom surface of the hold structure 56 are adapted to contact against inner walls (not shown in figures) of the external electronic device 14, so as to constrain movement of the sliding component 32 relative to the base 30 and to prevent the sliding component 32 from structural deformation. The first slide shaft 40 is disposed on an oblique area A of the sliding component 32. The first slide shaft 40 can be integrated with the sliding component 32 monolithically.

Figure 5:
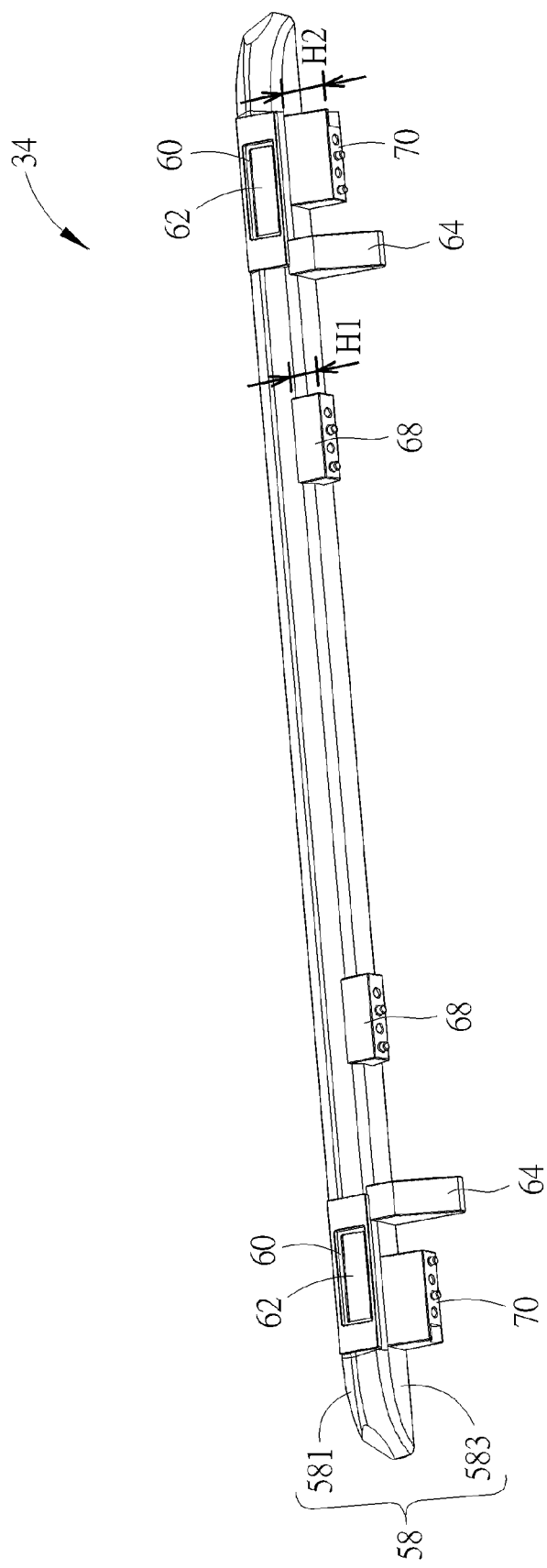
FIG. 5 is a diagram of a holder according to the embodiment of the present invention.

Please refer to FIG. 3 and FIG. 5. FIG. 5 is a diagram of the holder 34 according to the embodiment of the present invention. The holder 34 shown in FIG. 5 is another view of the holder 34 shown in FIG. 3. The holder 34 includes a body 58, at least one accommodating portion 60, at least one second attractive component 62, at least one pushing portion 64, at least one positioning portion 66, at least one first bridging portion 68 and at least one second bridging portion 70. The body 58 is adapted to hold the portable electronic device 12. The body 58 can include a bottom portion 581 and a lateral portion 583. The bottom portion 581 is connected to the lateral portion 583 to form an L-shaped structure, which is utilized to hold adjacent surfaces of the portable electronic device 12. The body 58 further can be an U-shaped structure formed by the single bottom portion and the dual lateral portions, or any other structure capable of holding the portable electronic device 12. The accommodating portion 60 is disposed on the body 58.

An amount of the second attractive component 62 corresponds to an amount of the accommodating portion 60. Each second attractive component 62 is disposed inside the accommodating portion 60. The first attractive component 20 and the second attractive component 62 preferably can be magnetic units, such as permanent magnets or electromagnetic magnets. The magnetic attractive force or the magnetic repulsive force is generated for assembly and disassembly. An amount of the pushing portion 64 corresponds to an amount of the inclined structure 50. The pushing portion 64 is disposed on an outer surface of the body 58 to contact against the inclined structure 50 and move the sliding component 32. The pushing portion 64 can be omitted according to actual demand. The positioning portion 66 is disposed inside the body 58. The positioning portion 66 can be wedged with the constraint slot 22 of the portable electronic device 12 to constrain movement or shake of the portable electronic device 12 relative to the external electronic device 14. The first bridging portion 68 and the second bridging portion 70 are disposed on the outer surface of the body 58. The first bridging portion 68 is directly connected to the first hinge mechanism 36. The second bridging portion is connected to a pillar (or integrated with the pillar monolithically), and the pillar passes through the open slot 80 on the arm 78 to connect with the second hinge mechanism 44.

Figure 6:
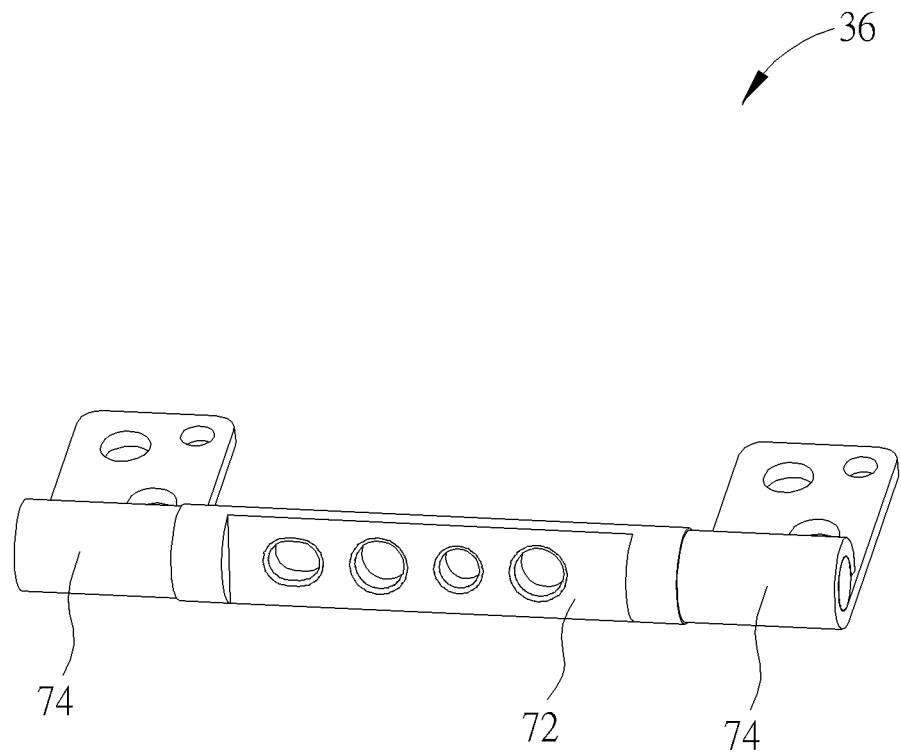
FIG. 6 is a diagram of a first hinge mechanism according to the embodiment of the present invention.

Please refer to FIG. 3 and FIG. 6. FIG. 6 is a diagram of the first hinge mechanism 36 according to the embodiment of the present invention. The first hinge mechanism 36 can include a first connecting component 72 and a second connecting component 74. An amount of the second connecting component 74 can be one or more. The first connecting component 72 is disposed on the first bridging portion 68 of the holder 34. The second connecting components 74 are disposed on the base 30 and respectively pivot to two ends of the first connecting component 72. A torsion unit can be disposed between the first connecting component 72 and the second connecting component 74. The first hinge mechanism 36 can preferably include two torsion units, so that the first hinge mechanism 36 has advantages of small volume and great torque value. Thickness of the external electronic device 14 can be decreased effectively due to small dimension of the first hinge mechanism 36, and the first hinge mechanism 36 stably holds the portable electronic device 12 by the great torque value. Relative rotary range between the portable electronic device 12 and the external electronic device 14 corresponds to design of the first hinge mechanism 36. For example, pivot range of the second connecting component 74 relative to the first connecting component 72 can be substantially within 0~35 degrees.

Figure 7:
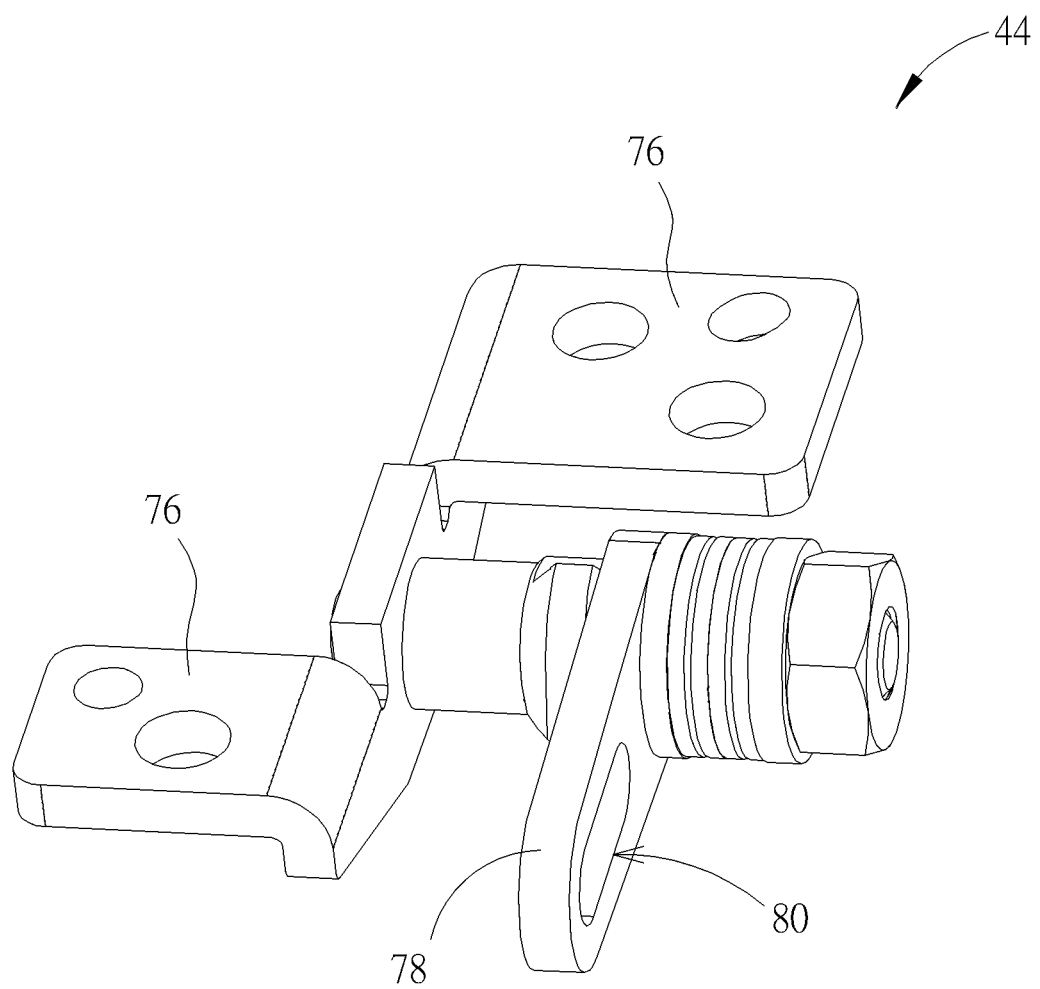
FIG. 7 is a diagram of a second hinge mechanism according to the embodiment of the present invention.

Please refer to FIG. 3 and FIG. 7. FIG. 7 is a diagram of the second hinge mechanism 44 according to the embodiment of the present invention. The second hinge mechanism 44 can include a plurality of connecting components 76 and the arm 78. The connecting component 76 is disposed on the base 30, and the arm 78 can be freely oscillated. Torque value of the second hinge mechanism 44 corresponds to an amount of the torsion unit disposed between the arm 78 and the connecting component 78. The open slot 80 is formed on the arm 78. The holder 34 further includes a rotary shaft 82. The rotary shaft 82 is disposed on the second bridging portion 70 of the body 58 and slidably disposed inside the open slot 80. The rotary shaft 82 is adapted to connect the second hinge mechanism 44 with the holder 34. When the holder 34 rotates, the rotary shaft 82 slides along the open slot 80 to rotate the arm 78, and the torque value is generated accordingly. Rotary range of the holder 34 relative to the base 30 is constrained by the second hinge mechanism 44. For example, an angle formed between the portable electronic device 12 and the external electronic device 14 can be substantially within a range of 100~135 degrees. The rotary shaft 82 can be integrated with the second bridging portion 70 monolithically.

Figure 8:
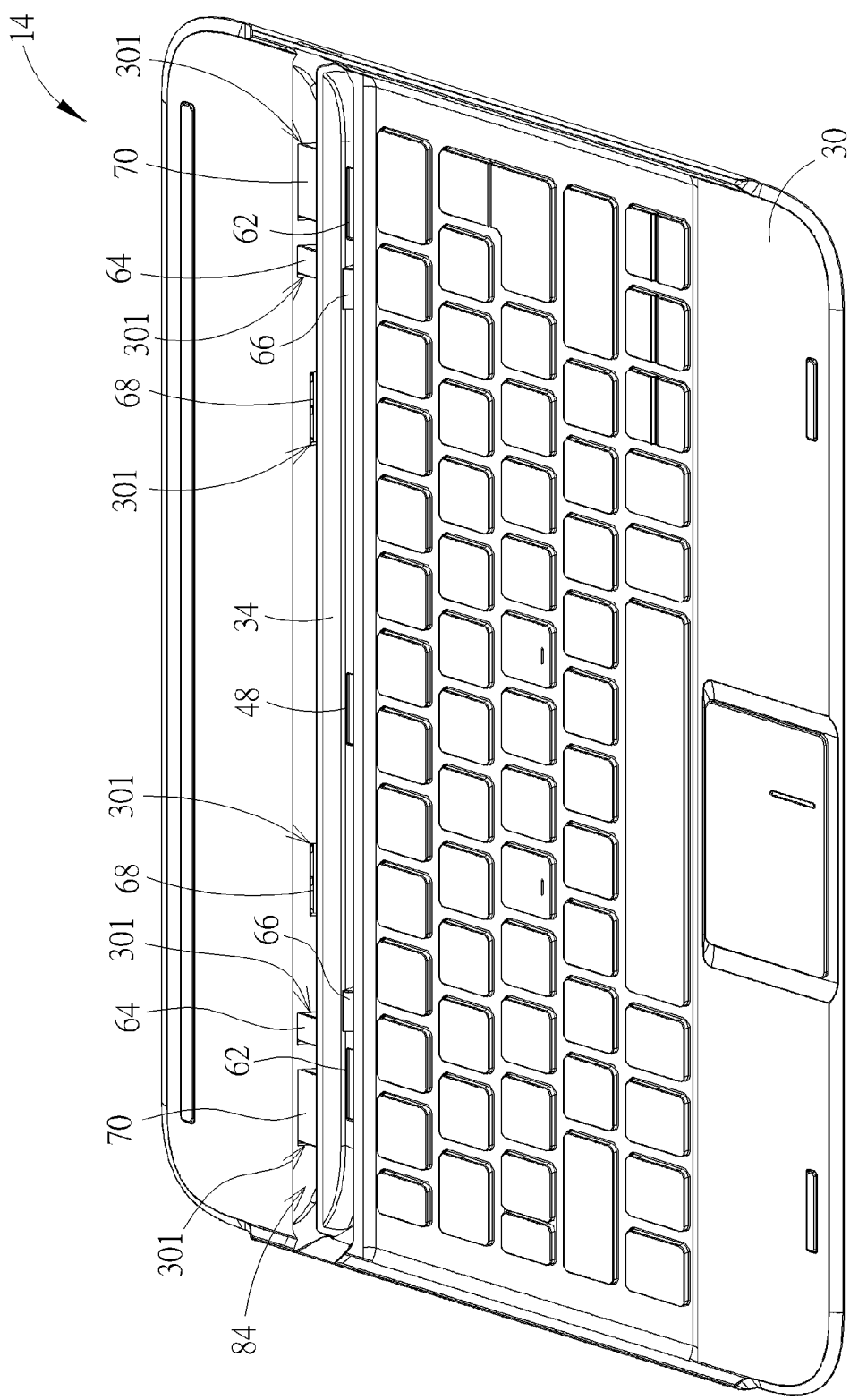
FIG. 8 and FIG. 9 respectively are partial diagrams of the external electronic device in different view angles according to the embodiment of the present invention.
Figure 9:
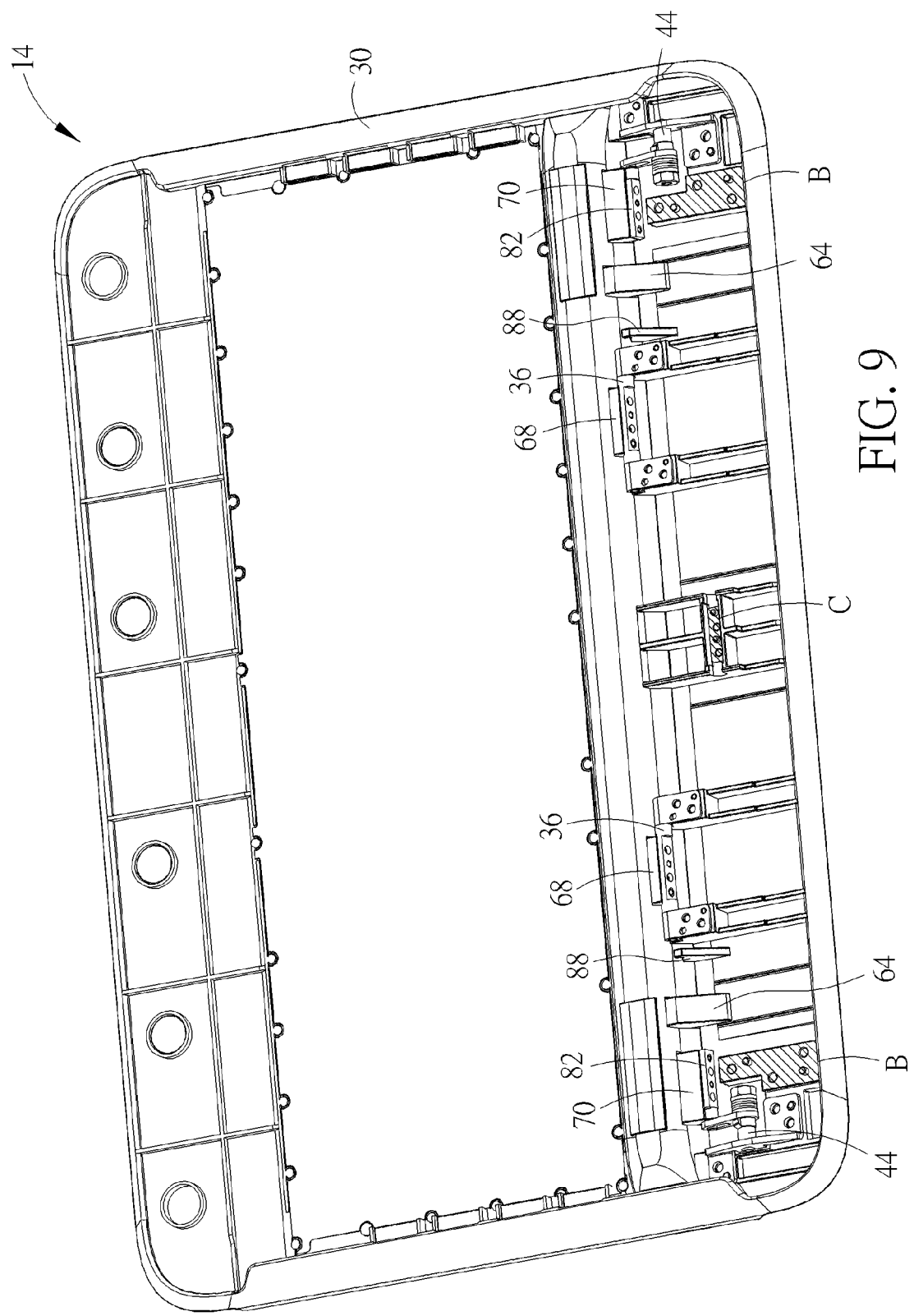

Please refer to FIG. 3, FIG. 4, FIG. 8 and FIG. 9. FIG. 8 and FIG. 9 respectively are partial diagrams of the external electronic device 14 in different view angles according to the embodiment of the present invention. As shown in FIG. 8, the signal adapter 48 is disposed on the holder 34. Position of the signal adapter 48 corresponds to position of the signal transmitter 24 of the portable electronic device 12. As the portable electronic device 12 is erectly connected with the holder 34, the signal adapter 48 is electrically connected to the signal transmitter 24 to establish communication between the portable electronic device 12 and the external electronic device 14. The base 30 can include a sunken structure 84 where inside the holder 34 is disposed. A height of the holder 34 is substantially smaller than a depth of the sunken structure 84. The holder 34 does not protrude from the sunken structure 84 when the holder 34 rotates relative to the base 30. The portable electronic device 12 can be assembled with the external electronic device 14 in the planar manner via the magnetic attractive force generated by the first magnetic component set 26 and the second magnetic component set 28, and the portable electronic device 12 is not structurally interfered with the holder 34. The pushing portion 64, the first bridging portion 68 and the second bridging portion 70 of the holder 34 pass through a plurality of holes 301 on the base 30 to extend toward the opposite side (a bottom view shown in FIG. 9) of the base 30.

As shown in FIG. 9, the chute seat 38 is disposed on an oblique area B of the base 30, and the second slide shaft 42 is disposed on an oblique area C of the base 30. The chute seat 38 and the second slide shaft 42 can be selectively integrated with the base 30 monolithically. The chute seat 38 can include a guide slot 381, as shown in FIG. 3. An end of the first slide shaft 40 disposed on the sliding component 32 is movably disposed inside the guide slot 381 on the chute seat 38. Movement of the sliding component 32 relative to the base 30 is constrained by the chute seat 38. Two ends of the second slide shaft 42 movably contact against opposite inner walls (as shown in FIG. 4) of the constraint structure 54. The movement of the sliding component 32 relative to the base 30 can be further constrained by an assembly of the second slide shaft 42 and the constraint structure 54. The sliding component 32 further can include at least one engaging portion 86, as shown in FIG. 4. The base 30 further can include at least one second engaging portion 88. Amounts of the first engaging portion 86 and the second engaging portion 88 correspond to an amount of the resilient component 46. Two ends of the each resilient component 46 are respectively connected to the base 30 and the sliding component 32 via the above-mentioned engaging portions. Resilient recovery of the resilient component 46 is utilized to reduce an interval between the base 30 and the sliding component 32.

As shown in FIG. 5 to FIG. 9, the height H1 of the first bridging portion 68 can be preferably smaller than, but not limited to, the height H2 of the second bridging portion 70. The first bridging portion 68 is disposed on a boundary between the bottom portion 581 and the lateral portion 583, which provides larger contact area to increase assembly intensity of the first bridging portion 68 and the outer surface of the body 58. The second bridging portion 70 is disposed on the outer surface of the lateral portion 583. Connection between the holder 34 and the first hinge mechanism 36 is different from connection between the holder 34 and the second hinge mechanism 44. A pivot axis of the first hinge mechanism 36 and a pivot axis of the second hinge mechanism 44 are non-linear, which means a pivot center of the first hinge mechanism 36 misaligns with a pivot center of the second hinge mechanism 44. The external electronic device 14 utilizes torque generated by the first hinge mechanism 36 to hold the portable electronic device 12, and the second hinge mechanism 44 is an auxiliary unit. When the portable electronic device 12 is pressed, the pillar is oscillated to hit lateral walls of the open slot 80 to decay vibration. The second hinge mechanism 44 can rapidly balance the external press to prevent the portable electronic device 12 from continuous vibration.

Figure 10:
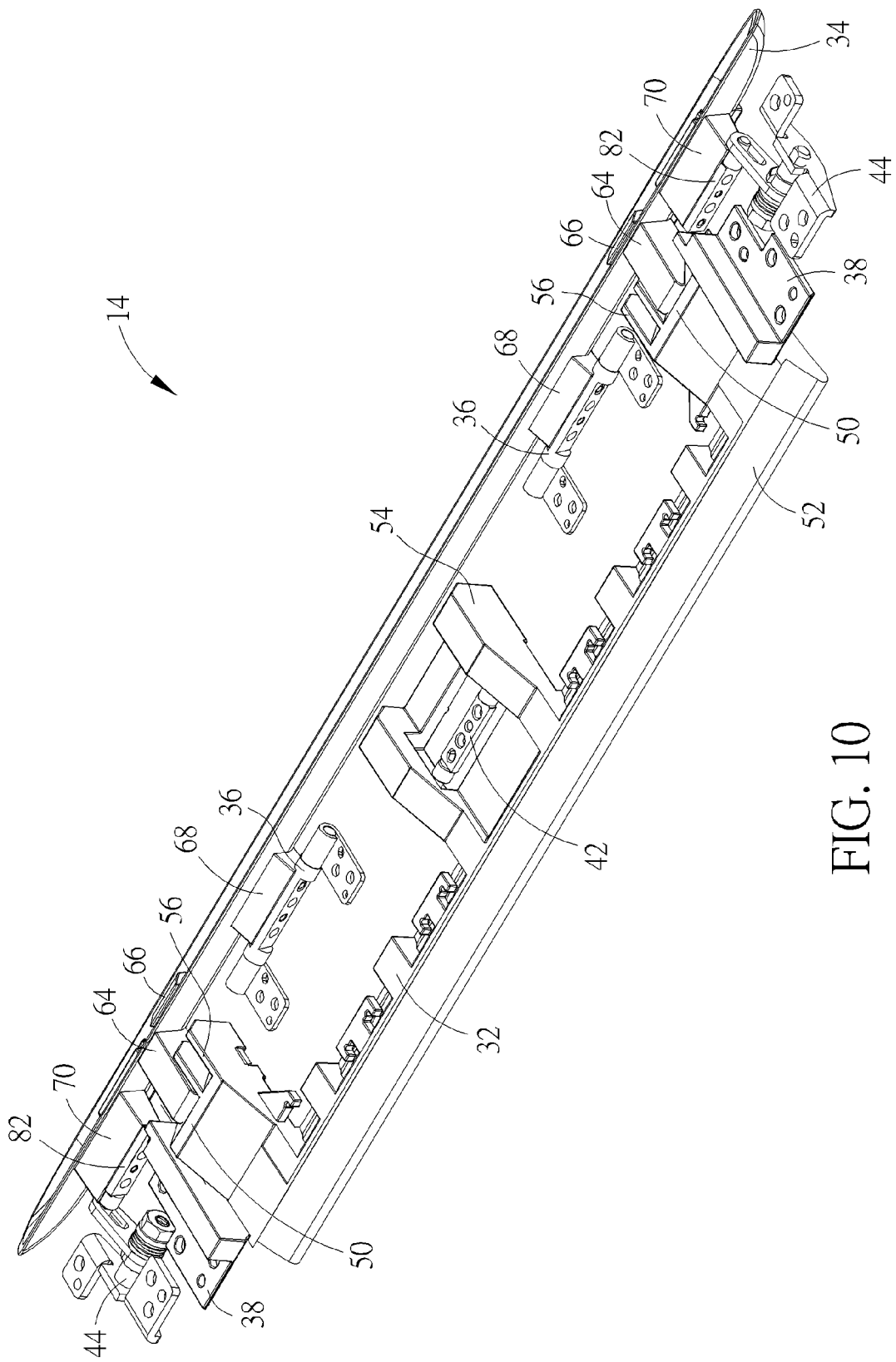
FIG. 10 and FIG. 11 respectively are partial diagrams of the external electronic device in the first operational mode according to the embodiment of the present invention.
Figure 11:
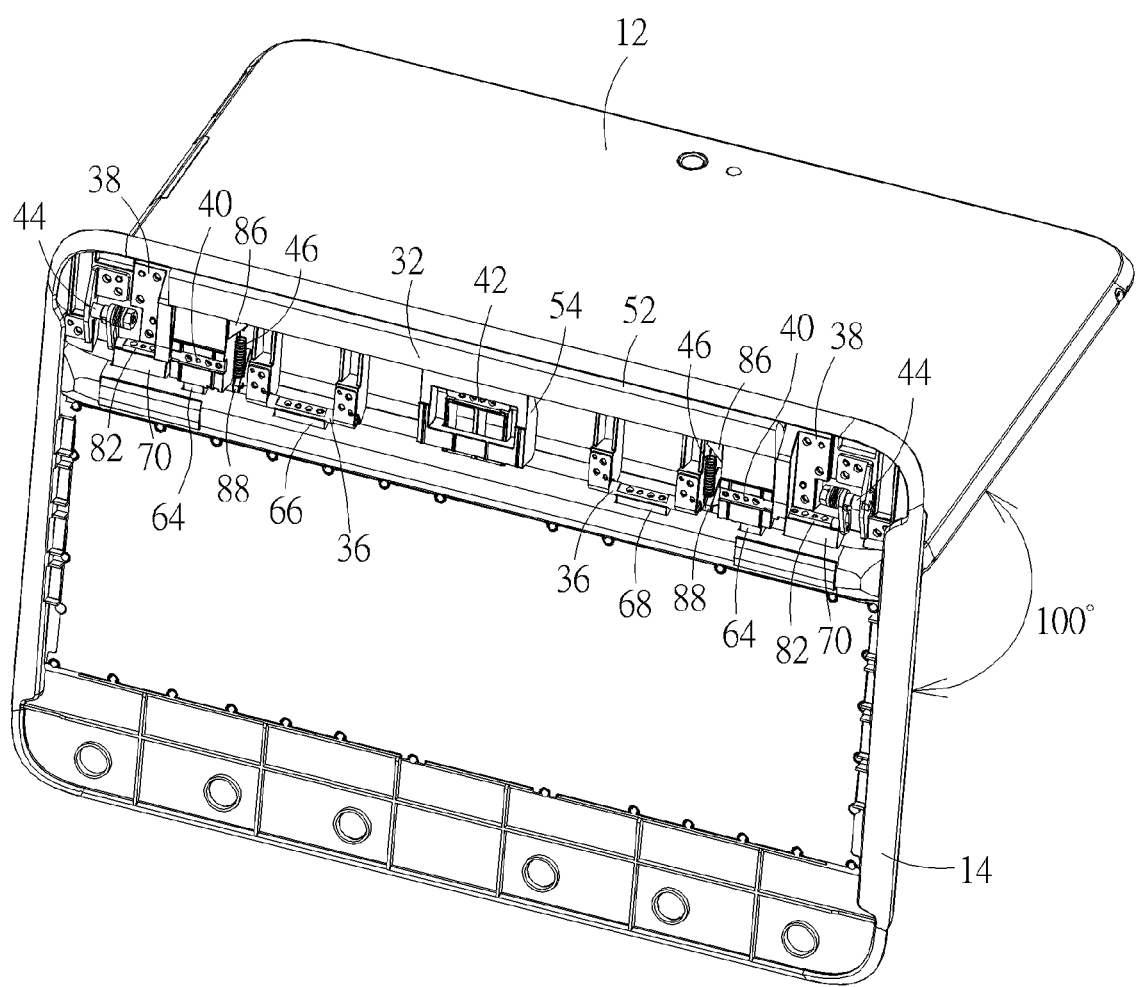
Figure 12:
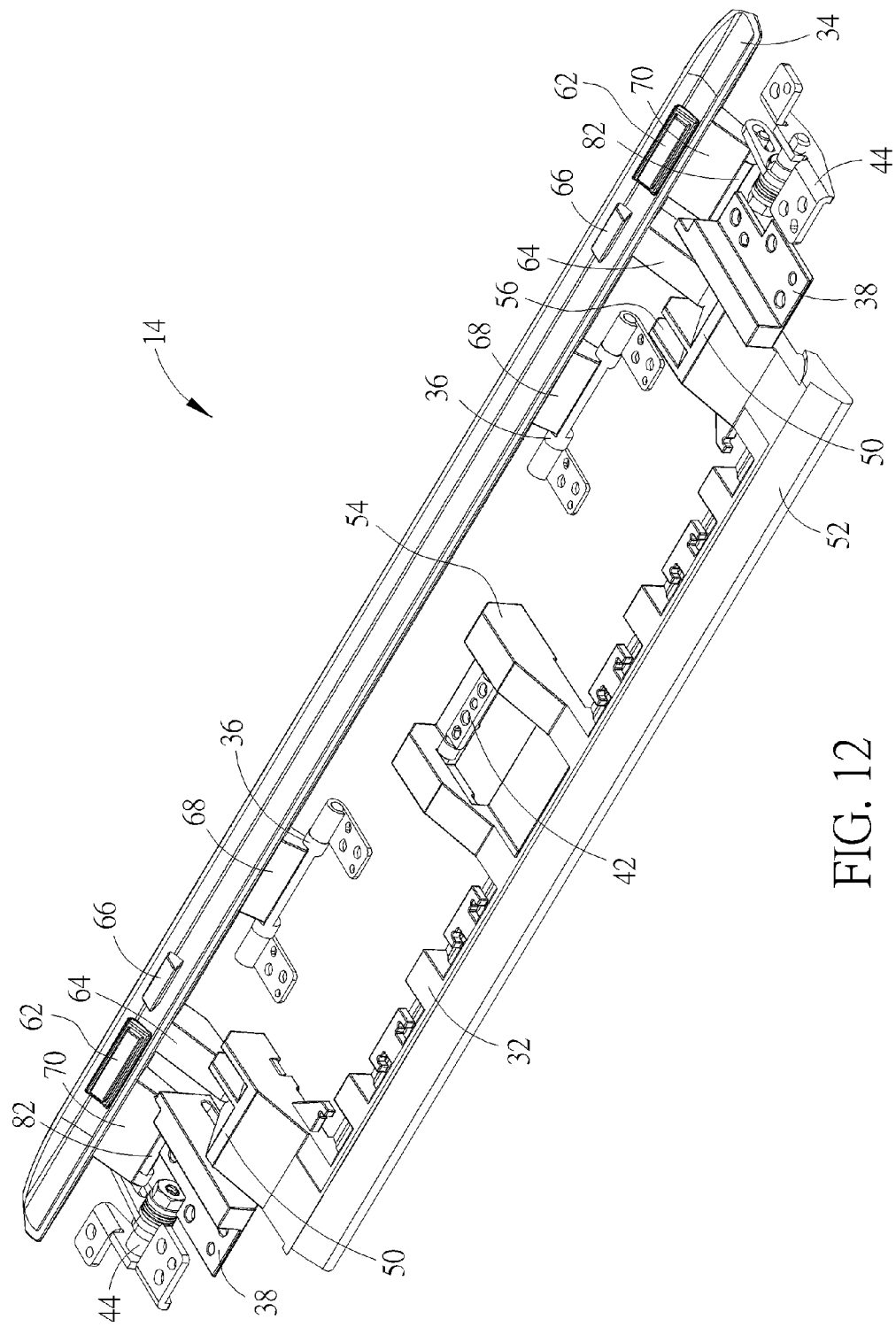
FIG. 12 and FIG. 13 respectively are partial diagrams of the external electronic device in the second operational mode according to the embodiment of the present invention.
Figure 13:
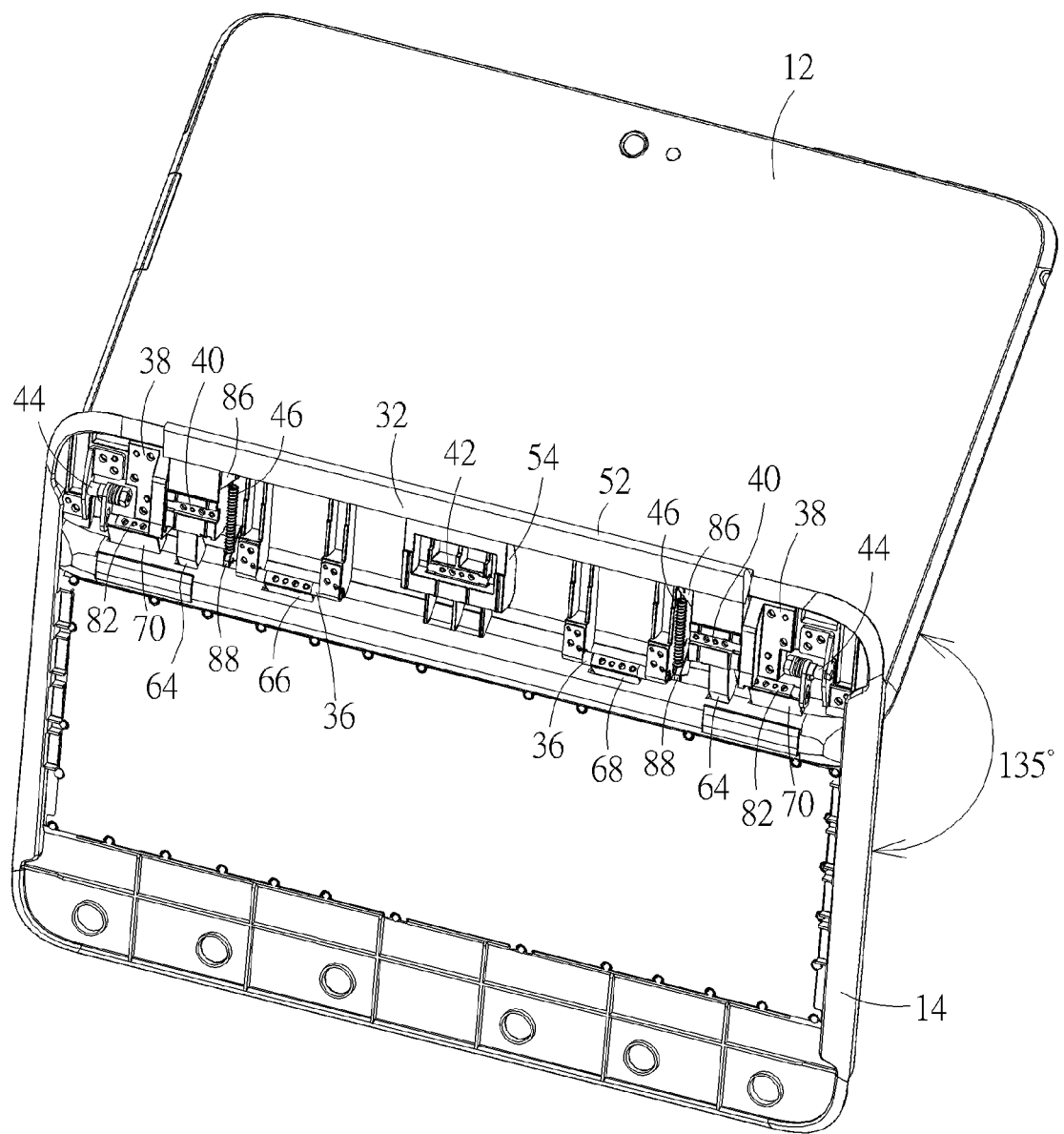

Please refer to FIG. 10 to FIG. 13. FIG. 10 and FIG. 11 respectively are partial diagrams of the external electronic device 14 in the first operational mode according to the embodiment of the present invention. FIG. 12 and FIG. 13 respectively are partial diagrams of the external electronic device 14 in the second operational mode according to the embodiment of the present invention. In the first operational mode shown in FIG. 10 and FIG. 11, the sliding component 32 is accommodated inside the base 30, the support structure 52 of the sliding component 32 does not protrude from the base 30 of the external electronic device 14, and the gravity center of the external electronic device 14 is located at inner position. The positioning portion 66 of the holder 34 is vertically upward. The angle between the portable electronic device 12 and the external electronic device 14 is substantially equal to 100 degrees when the portable electronic device 12 is connected with the holder 34. In the meantime, the pushing portion 64 of the holder 34 contacts against the inclined structure 50 of the sliding component 32 in a line contact manner.

In the second operational mode shown in FIG. 12 and FIG. 13, the holder 34 rotates relative to the base 30 about 35 degrees, and the angle between the portable electronic device 12 and the external electronic device 14 can be adjusted to 135 degrees. The pushing portion 64 of the holder 34 presses the inclined structure 50 of the sliding component 32, the sliding component 32 slides relative to the base 30 to move the support structure 52 of the sliding component 32 out of the base 30, which means the support structure 52 protrudes from the casing of the external electronic device 14. Therefore, the gravity center of the external electronic device 14 in the second operational mode is located at outer position, to prevent the computer system 10 from overturn by slightly pressing the portable electronic device 12.

Figure 14:
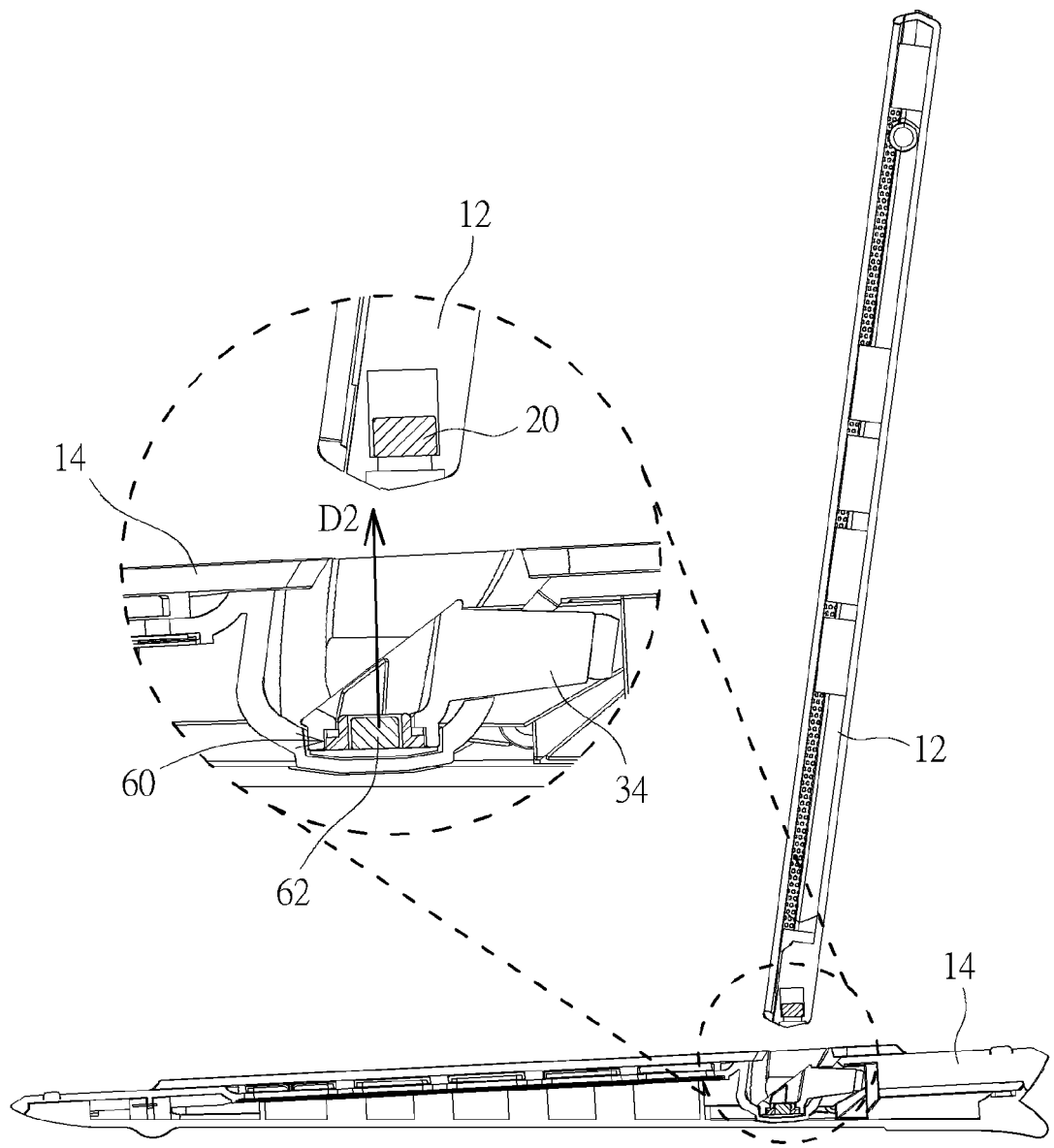
FIG. 14 is an enlarged disassembly diagram of the portable electronic device and the external electronic device according to the embodiment of the present invention.
Figure 15:
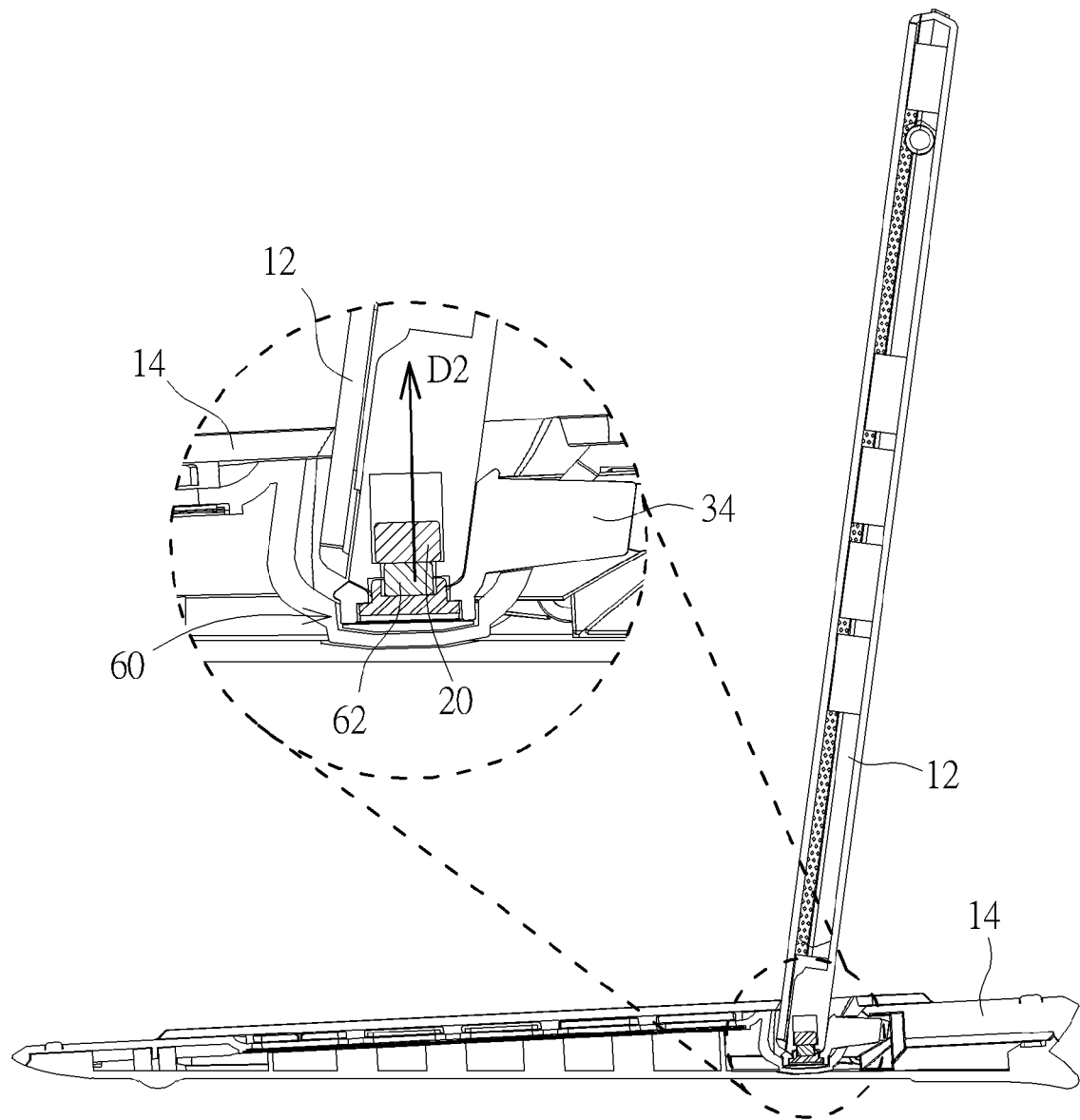
FIG. 15 is an enlarged assembly diagram of the portable electronic device and the external electronic device according to the embodiment of the present invention.

Please refer to FIG. 14 and FIG. 15. FIG. 14 is an enlarged disassembly diagram of the portable electronic device 12 and the external electronic device 14 according to the embodiment of the present invention. FIG. 15 is an enlarged assembly diagram of the portable electronic device 12 and the external electronic device 14 according to the embodiment of the present invention. As shown in FIG. 14, a distance between the portable electronic device 12 and the external electronic device 14 is greater than effectively magnetic induction between the first attractive component 20 and the second attractive component 62. The second attractive component 62 is not attracted by the first attractive component 20, so that the second attractive component 62 is located on bottom (an initial position) of the accommodating portion 60. For example, the second attractive component 62 magnetically contacts to an iron unit on the bottom of the accommodating portion 60.

As shown in FIG. 15, when the portable electronic device 12 is assembled with the external electronic device 14, the magnetic attractive force is generated by the first attractive component 20 and the second attractive component 62 due to close interval. The first attractive component 20 of the portable electronic device 12 is immobile, and the second attractive component 62 moves upwardly inside the accommodating portion 60 to be close to the first attractive component 20, so as to generate the maximum magnetic attractive force to stably connect the portable electronic device 12 with the holder 34. The second attractive component 62 moves up and down inside the accommodating portion 60, and the accommodating portion 60 is utilized to constrain movable range of the second attractive component 62.

The accommodating portion 60 and the second attractive component 62 can be applied to lots of embodiments. For example, gravity force can be utilized to fall down the second attractive component 62, to make the second attractive component 62 automatically backs to the initial position on the bottom of the accommodating portion 60. Further, permeance component can be disposed on the bottom of the accommodating portion 60. As the portable electronic device 12 is far from the external electronic device 14, the magnetic attractive force generated by the permeance component and the second attractive component 62 is greater than the magnetic attractive force generated by the first attractive component 20 and the second attractive component 62, and the permeance component can drive the second attractive component 62 back to the bottom of the accommodating portion 60. Application of the accommodating portion 60 and the second attractive component 62 is not limited to the above-mentioned embodiment, and depends on design demand.

Figure 16:
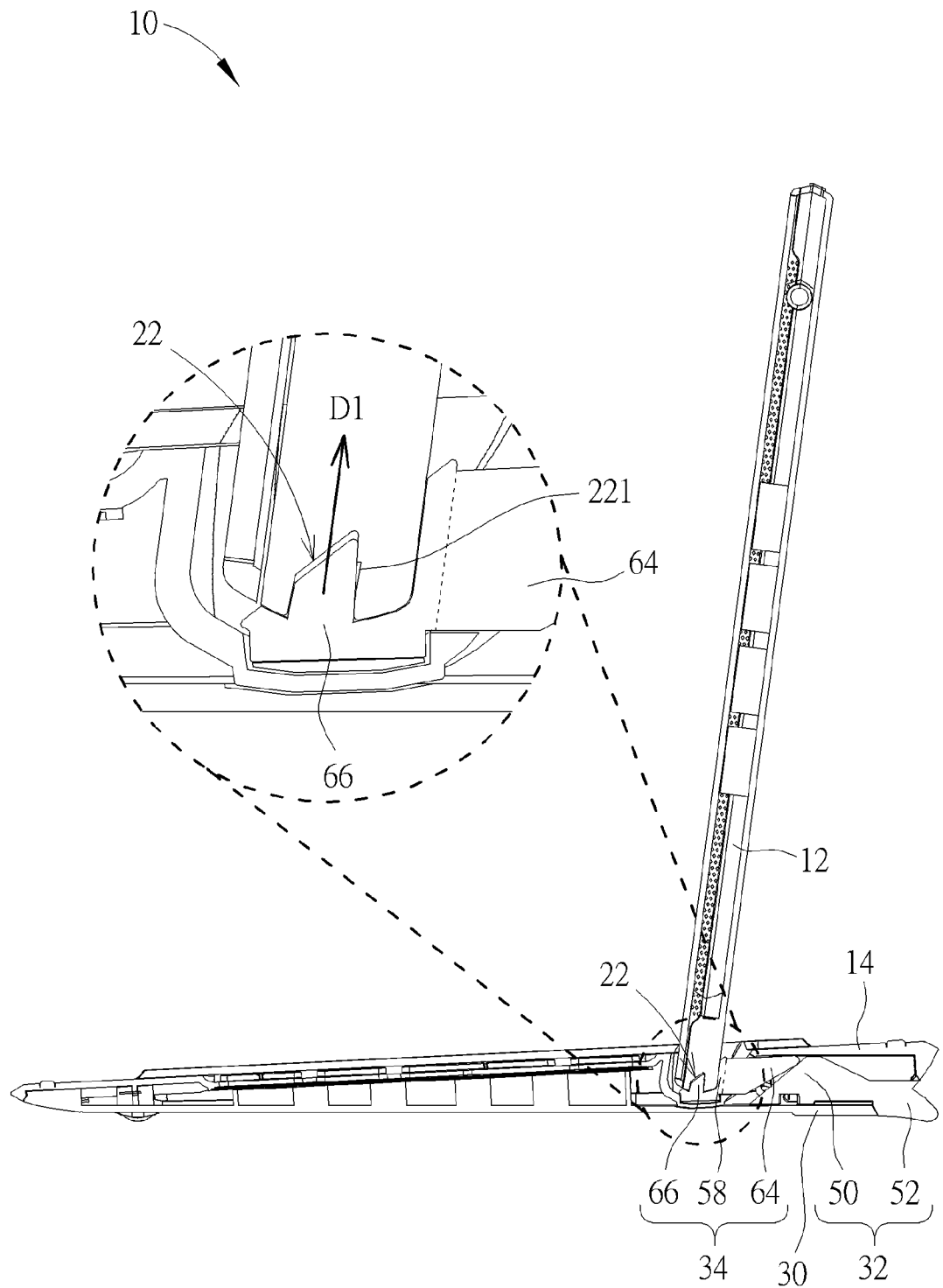
FIG. 16 is a partial diagram of the computer system according to the embodiment of the present invention.

Please refer to FIG. 16. FIG. 16 is a partial diagram of the computer system 10 according to the embodiment of the present invention. When the portable electronic device 12 is assembled with the external electronic device 14, the constraint slot 22 is wedged with the positioning portion 66, the casing 16 of the portable electronic device 12 is engaged between the positioning portion 66 and the body 58. A stage structure 221 can be preferably formed on an inner wall of the constraint slot 22, to effectively decrease contact area between the positioning portion 66 and the constraint slot 22 for better wedged stability of the positioning portion 66 and the constraint slot 22. As shown in FIG. 15 and FIG. 16, an extending direction D1 of the positioning portion 66 is preferably different from a moving direction D2 of the second attractive component 62 inside the accommodating portion 60. The first attractive component 20 tightly attracts the second attractive component 62 for the maximum magnetic attractive force. The moving direction D2 of the second attractive component 62 is not parallel to the extending direction D1 of the positioning portion 66, which can increase intensity of the structural interference to enhance steady assembly of the portable electronic device 12 and the holder 34.

Figure 17:
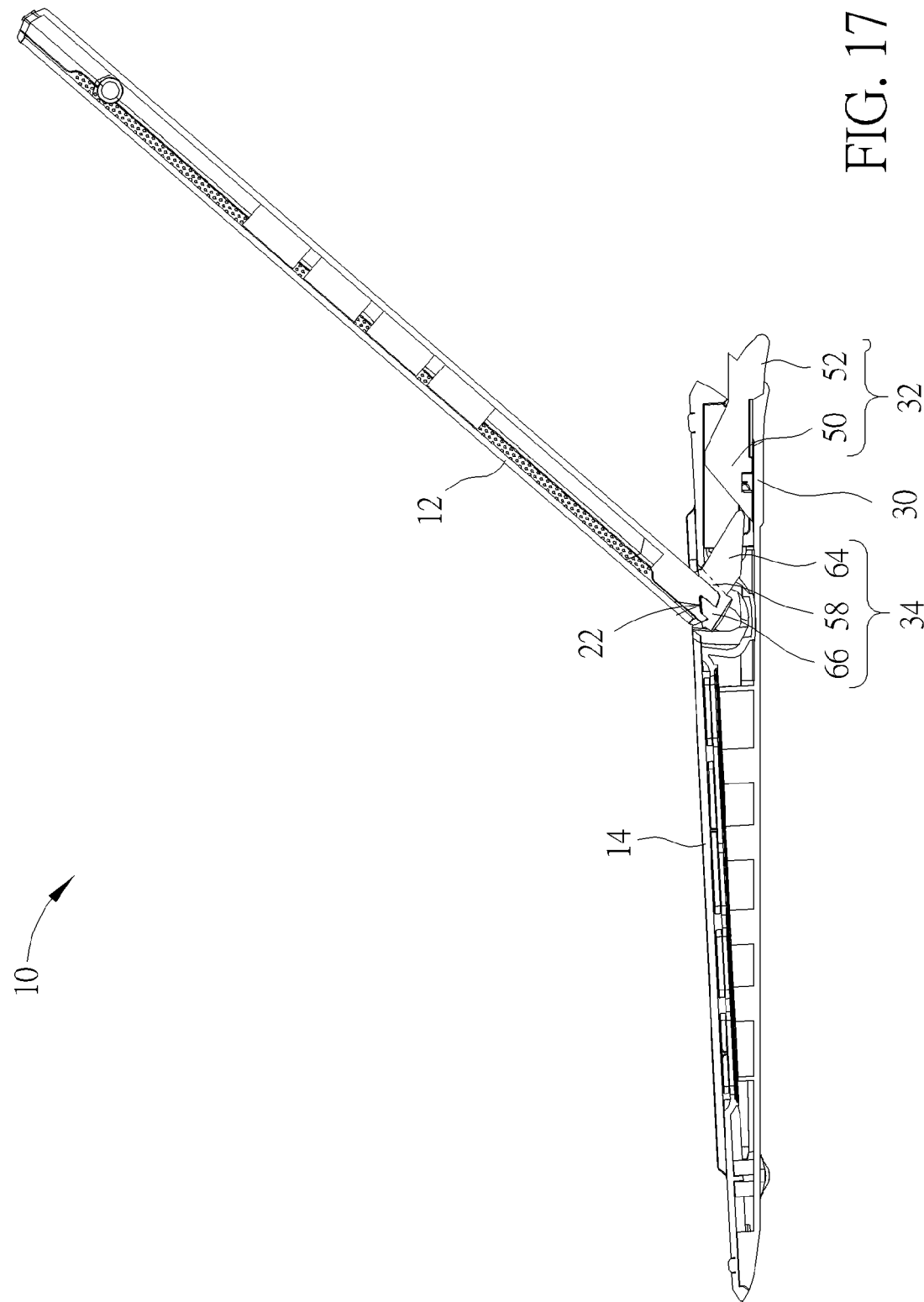
FIG. 17 is a diagram of the computer system after view angle adjustment according to the embodiment of the present invention.

Please refer to FIG. 16 and FIG. 17. FIG. 17 is a diagram of the computer system 10 after view angle adjustment according to the embodiment of the present invention. After the constraint slot 22 on the portable electronic device 12 is engaged with the positioning portion 66 of the holder 34, the external electronic device 14 utilizes engagement of the positioning portion 66 and the body 58 to fix the portable electronic device 12 on the holder 34. The portable electronic device 12 can be pressed at the clockwise direction or at the counterclockwise direction to adjust the view angle of the portable electronic device 12. The holder 34 rotates relative to the base 30 via the first hinge mechanism 36 and the second hinge mechanism 44 (not shown in FIG. 17), and the torque generated by the first hinge mechanism 36 and the second hinge mechanism 44 can fix the portable electronic device 12 at the specific view angle. As rotation of the holder 34, the pushing portion 64 of the holder 34 can press the inclined structure 50 of the sliding component 32 to move the support structure 52 out of the base 30, so as to prevent the computer system from the overturn effectively due to press of the portable electronic device 12.

When the external force applied to the portable electronic device 12 is removed, the external electronic device 14 utilizes the resilient recovering force of the resilient component 46 to pull the sliding component 32 back, and the support structure 52 of the sliding component 32 moves into the base 30. Selectively, the sliding component 32 can move back to the initial position by manually pressing the support structure 52. In the meantime, the inclined structure 50 of the sliding component 32 moves relative to the pushing portion 64 of the holder 34, so as to recover the holder 34 to the initial angle. For example, the angle between the portable electronic device 12 and the external electronic device 14 can be adjusted within a range of 100~135 degrees. The adjusting ranges of the portable electronic device 12, the first hinge mechanism 36 and the second hinge mechanism 44 are not limited to the above-mentioned embodiments, which might have tolerance of 10~15% or is adjustable according to user operation.

The computer system of the present invention utilizes the attractive components to assemble the portable electronic device with the external electronic device, so as to economize operation period of assembly and disassembly and to increase operation convenience. The holder of the external electronic device is hidden inside the sunken structure of the base. The holder is not exposed no matter what angle of the holder rotates relative to the base, which means the height of the holder is not greater than the depth of the sunken structure (by a front view and a lateral view of the computer system). The present invention further utilizes the magnetic components to connect the portable electronic device with the external electronic device in the planar direction, to minimize volume of the computer system for convenient carry. It should be mentioned that the present invention utilizes the movable support structure to prevent the external electronic device from the overturn when the portable electronic device is pressed. The external electronic device holds the portable electronic device by the holder. As the portable electronic device rotates relative to the external electronic device, rotation of the holder can move the sliding component relative to the base, the support structure of the sliding component protrudes from the base, and the gravity center of the external electronic device is adjusted to stably hold the portable electronic device. Therefore, the external electronic device is light and handy (without the conventional weight block), and trends toward consumer's demand.

The external electronic device utilizes the dual pivot mechanisms to reduce vibration of the portable electronic device. The first hinge mechanism is mainly for generating the torque, and the second hinge mechanism generates the auxiliary torque and is further utilized to reduce the vibration. The second hinge mechanism can be omitted herein for simplicity. The external electronic device utilizes the assembly of the positioning portion and the constraint slot, and the assembly of the first attractive component and the second attractive component to fix the portable electronic device. The extending direction of the positioning portion is different from the magnetic attractive direction of the attractive components, so as to usefully increase the assembly intensity of the portable electronic device and the holder by the structural interference. The holder utilizes the first hinge mechanism and the second hinge mechanism to stably rotate relative to the base, the sliding component utilizes the chute seat and the hold structure to constrain the sliding direction relative to the base, so that the external electronic device has stable operating function. The external electronic device further includes a plurality of decorative covers disposed between the sliding component and the base, or between the holder and the base for dust-proof function and decoration.

Comparing to the prior art, the holder of the external electronic device of the present invention is hidden inside the base for preferred aesthetic. Assembly of the positioning portion and the attractive components can be adapted to assemble the portable electronic device with the external electronic device for preferable assembly/disassembly convenience. As the view angle of the portable electronic device is adjusted, the movable sliding component can change the gravity center's position of the external electronic device. Thus, the external electronic device and the related computer system of the present invention not only have advantages of slight volume and easy operation, but also effectively solve conventional drawbacks of difficult position setting and inaesthetic appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An external electronic device for connecting to a portable electronic device, the portable electronic device having a first attractive component, the external electronic device comprising:
    a base;
    a holder rotatably disposed on the base, the holder comprising:
        a body for holding the portable electronic device;
        an accommodating portion disposed on the body;
        a second attractive component disposed on the accommodating portion, the second attractive component attracting the first attractive component to connect the portable electronic device with the holder; and
        a pushing portion disposed on an outer surface of the body;
    a first hinge mechanism disposed between the base and the holder, the holder rotating relative to the base via the first hinge mechanism; and
    a sliding component slidably disposed on the base, the pushing portion pressing the sliding component to move the sliding component away from the holder and to expose at least one part of the sliding component out of the base when the holder rotates relative to the base.

2. The external electronic device of claim 1, wherein the sliding component comprises an inclined structure adapted to contact against the pushing portion.

3. The external electronic device of claim 1, wherein the at least one part of the sliding component is a support structure, and the pushing portion pushes the support structure to move out of the base for changing the center-of-gravity position of the external electronic device when the holder rotates relative to the base.

4. The external electronic device of claim 1, further comprising:
    a chute seat disposed on the base, a guide slot being formed on the chute seat; and
    a first slide shaft disposed on the sliding component, an end of the first slide shaft being movably disposed inside the guide slot.

5. The external electronic device of claim 4, wherein the sliding component further comprises a constraint structure, the external electronic device further comprises:
    a second slide shaft disposed on the base, two ends of the second slide shaft movably contacting against the constraint structure.

6. The external electronic device of claim 1, wherein the base comprises a sunken structure, and the holder is disposed inside the sunken structure.

7. The external electronic device of claim 1, wherein the body comprises a bottom portion and a lateral portion for respectively holding adjacent surfaces of the portable electronic device, the bottom portion is connected to the lateral portion.

8. The external electronic device of claim 1, wherein the portable electronic device comprises a constraint slot, the holder further comprises:
    a positioning portion disposed inside the body for wedging with the constraint slot to engage the portable electronic device between the positioning portion and the body, wherein a moving direction of the second attractive component inside the accommodating portion is different from an extending direction of the positioning portion.

9. The external electronic device of claim 1, further comprising:
    a second hinge mechanism disposed between the base and the body.

10. The external electronic device of claim 9, wherein the holder further comprises a first bridging portion and a second bridging portion disposed on an outer surface of the body and respectively connected to the first hinge mechanism and the second hinge mechanism.

11. A computer system comprising:
    a portable electronic device comprising a casing and a first attractive component, the first attractive component being disposed on an edge of the casing; and
    an external electronic device, the portable electronic device being electrically connected to the external electronic device in a detachable manner, the external electronic device comprising:
        a base;
        a holder rotatably disposed on the base, the holder comprising:
            a body for holding the portable electronic device;
            an accommodating portion disposed on the body;
            a second attractive component disposed on the accommodating portion, the second attractive component attracting the first attractive component to connect the portable electronic device with the holder; and
            a pushing portion disposed on an outer surface of the body;
        a first hinge mechanism disposed between the base and the holder, the holder rotating relative to the base via the first hinge mechanism; and
        a sliding component slidably disposed on the base, the pushing portion pressing the sliding component to move the sliding component away from the holder and to expose at least one part of the sliding component out of the base when the holder rotates relative to the base.

12. The computer system of claim 11, wherein the sliding component comprises an inclined structure adapted to contact against the pushing portion.

13. The computer system of claim 11 wherein the at least one part of the sliding component is a support structure, and the pushing portion pushes the support structure to move out of the base for changing the center-of-gravity position of the external electronic device when the holder rotates relative to the base.

14. The computer system of claim 11, further comprising:
    a chute seat disposed on the base, a guide slot being formed on the chute seat; and
    a first slide shaft disposed on the sliding component, an end of the first slide shaft being movably disposed inside the guide slot.

15. The computer system of claim 14, wherein the sliding component further comprises a constraint structure, the external electronic device further comprises:
    a second slide shaft disposed on the base, two ends of the second slide shaft movably contacting against the constraint structure.

16. The computer system of claim 11, wherein the base comprises a sunken structure, and the holder is disposed inside the sunken structure.

17. The computer system of claim 11, wherein the body comprises a bottom portion and a lateral portion for respectively holding adjacent surfaces of the portable electronic device, the bottom portion is connected to the lateral portion.

18. The computer system of claim 11, wherein the portable electronic device further comprises a constraint slot, the holder further comprises:
    a positioning portion disposed inside the body for wedging with the constraint slot to engage the casing of the portable electronic device between the positioning portion and the body, wherein a moving direction of the second attractive component inside the accommodating portion is different from an extending direction of the positioning portion.

19. The computer system of claim 11, wherein the external electronic device further comprises:
    a second hinge mechanism disposed between the base and the body.

20. The computer system of claim 19, wherein the holder further comprises a first bridging portion and a second bridging portion disposed on an outer surface of the body and respectively connected to the first hinge mechanism and the second hinge mechanism.

\* \* \* \* \*